United States Patent Office 3,483,177
Patented Dec. 9, 1969

3,483,177
METHOD FOR THE POLYMERIZATION OF BUTADIENE AND BUTADIENE IN MIXTURE WITH OTHER DIOLEFINS USING (1) ORGANOMETALLICS, (2) ORGANIC Ni OR Co, AND (3) $BF_3$ COMPLEXED WITH ALDEHYDES, KETONES, ESTERS AND NITRILES
Morford C. Throckmorton and William M. Saltman, Akron, Ohio, assignors to The Goodyear Tire & Rubber Company, Akron, Ohio, a corporation of Ohio
No Drawing. Filed Dec. 15, 1967, Ser. No. 690,767
Int. Cl. C08d *1/14, 3/08;* B01j *11/84*
U.S. Cl. 260—94.3                    12 Claims

ABSTRACT OF THE DISCLOSURE

There is disclosed a method and a catalyst system for the solution polymerization of butadiene or butadiene in mixture with other diolefins to form polymers containing a high content of cis 1,4 addition. The solution polymerization is carried out under conventional polymerization conditions and the catalyst employed is a mixture of (1) organometallic compounds of the metals of Groups I, II and III, (2) at least one compound selected from the class consisting of organonickel and organocobalt compounds and (3) at least one boron trifluoride complex prepared by complexing boron trifluoride with at least one member of a class consisting of ketones, aldehydes, esters and nitriles, all members of this class being characterized by having a carbon atom attached directly by a multiple bond to at least one atom selected from the class consisting of oxygen and nitrogen.

---

This invention is directed to methods of polymerizing butadiene and butadiene in mixture with other diolefins to form polymers having a high content of cis 1,4 addition. It is also directed to catalyst systems useful for this purpose.

Polymers of butadiene or butadiene in mixture with other diolefins containing a high proportion of the butadiene units in the cis 1,4 configuration possess properties which make them useful as synthetic rubbers.

It is an object of this invention to provide a method whereby butadiene can be polymerized to a high content of cis 1,4 polybutadiene. Another object is to provide a catalyst system by which these polymerizations may be accomplished. Another object is to form copolymers of isoprene or other diolefins and butadiene in which the polybutadiene segment has a high content of cis 1,4 structure. Another object is to produce high cis 1,4 polybutadiene with excellent processing properties. Other objects will become apparent as the description proceeds.

The term "good processability" describes a polymer which before and after compounding manifests properties ideal for use on rubber processing equipment. These desirable properties lead to ready banding on mix mills, good tack and ease of extrudability. It is still obscure which chemical and physical parameters of a polymer contribute to the properties associated with good processability.

For example, polybutadiene made by a process using a two component catalyst system consisting of trialkylaluminum and titanium tetraiodide has a cis 1,4 molecular configuration in the neighborhood of 90 to 94% of the polymer structure formed. However, as a general rule, the polybutadiene produced by this process does not possess the unltimate in processability properties, and often requires blending with other elastomers to attain the desired degree of processability with standard rubber mixing and forming machinery. In spite of its relatively high cis 1,4 content, the polybutadiene produced by this process is on the average, no better or no worse in processing properties than polybutadiene made with the alkyllithium catalyst system which produces a polybutadiene with about a 40% cis 1,4 structure. Polybutadiene made with the two component catalyst system comprising alkylaluminum halides and cobalt salts results in molecular structures very high in cis 1,4 configuration (in the neighborhood of 98%), yet these polymers do not show appreciable processing advantage over the polybutadiene type polymers made by either of the other two processes previously mentioned.

Based on the most practical test of what indicates good polymer processability, that is, manifestations during actual factory processing, polybutadiene produced by a ternary catalyst system comprising (1) triethylaluminum, (2) an organonickel salt, and (3) boron trifluoride·diethyl ether complex, which possesses a very high cis 1,4 molecular structure of about 98%, shows an appreciable gain in processability over the polybutadienes prepared in the aforementioned processes.

The present invention employs a ternary catalyst system similar to that last mentioned prior art catalyst system except the one catalyst component comprises boron trifluoride complexed with at least one member from the group comprising ketones, aldehydes, esters and nitriles, all members of the group being characterized by a carbon atom attached directly by a multiple bond to at least one atom selected from the class consisting of oxygen and nitrogen. The polymer produced by the system of the present invention has excellent processability.

Like the prior art ternary catalyst system just mentioned, the present invention normally is somewhat limited with respect to the selection of the trialkylaluminum component if optimum reaction rate and polymer molecular weight are to be obtained. To maintain the optimum reaction rate with the present catalyst system the choice of aluminum trialkyl compounds usually is limited to triethylaluminum or trimethylaluminum. When the methyl and ethyl groups in the alkylaluminum compounds are replaced by longer chain alkyl groups, for example, n-propyl or isobutyl, the polymerization rate generally is somewhat reduced and often the polymer molecular weight is reduced below desirable values.

There is on group of standout exceptions in the class of compounds making up the present invention. When one of the catalyst components comprises boron trifluoride complexed with aromatic aldehydes, representative examples of which are benzaldehyde, tolualdehyde, m-ethylbenzaldehyde, p-butylbenzaldehyde, m-nitrobenzaldehyde, p-nitrobenzaldehyde, m-hydroxybenzaldehyde and phenylacetaldehyde, the overall system is much more versatile with respect to the selection of the organoaluminum compound. Thus, all tri-(n-alkyl)aluminums or di-(n-alkyl)aluminum hydrides, in which the alkyl groups contain from one to ten carbon atoms, result in high and approximately equivalent polymerization rates and equivalent polymer average molecular weights when utilized in the presently described catalyst system in conjunction with a boron trifluoride complex of the above types of aromatic aldehydes. Furthermore, when the alkyl groups in the organoaluminum compounds are branched so that they contain tertiary carbon atoms, as illustrated by triisobutylaluminum, triisohexylaluminum [tri(2 - methyl - 1 - pentyl)aluminum], diisobutylaluminum hydride and aluminum isoprenyl, the polymerization rate is significantly enhanced when employing boron trifluoride complexes of the above aromatic aldehydes. This is in sharp contrast to the very low polymerization rate and low polymer molecular weight obtained when using these branched chain containing organoaluminum compounds in conjunction with boron trifluoride·diethyl ether complex. Thus, the boron trifluoride complexes with the above types of aromatic aldehydes possess catalytic activities for the presently described polymerization system which are significantly different and are generally superior to the activity of boron trifluoride etherate.

When one of the catalyst components is comprised of a boron trifluoride complex with an aromatic aldehyde containing a hydroxy group attached to the aromatic ring in a position ortho- to the aldehyde group, as illustrated by o-hydroxybenzaldehyde [salicylaldehyde], o-hydroxyphenylacetaldehyde and o-hydroxy-p-methylbenzaldehyde, the boron trifluoride·hydroxyaromatic aldehydes are catalytically active, but this class of aldehydes does not exhibit enhanced activity when utilized with organoaluminum compounds containing tertiary carbon atoms. The reason for the difference in activity is not known but it is hypothesized that it is related to the fact that hydrogen bonding occurs in o-hydroxy aldehydes.

Thus, according to the invention, butadiene or butadiene in combination with other diolefins is polymerized by contact under solution polymerization conditions with a catalyst comprising (1) at least one organometallic compound in which the metal is selected from Groups I, II and III of the Periodic System, (2) at least one organometallic compound selected from the class consisting of organonickel and organocobalt compounds, and (3) at least one boron trifluoride complex prepared by complexing boron trifluoride with a member of the class consisting of ketones, aldehydes, esters and nitriles, all members of the class containing a carbon atom attached directly by a multiple bond to at least one atom selected from the class consisting of oxygen and nitrogen.

The organometallic compounds wherein the metals are selected from Groups I, II and III of the Periodic System are organocompounds of such metals as lithium, sodium, potassium, rubidium, cesium, magnesium, calcium, strontium, beryllium, barium, zinc, cadmium, aluminum, gallium and indium. The term "organometallic," as used here to refer to compounds, indicates that metals of Groups I, II and III of the Periodic System are attached directly to a carbon atom of alkyl, cycloalkyl, aryl, arylalkyl and alkaryl radicals. All of the above compounds may be used in the practice of this invention.

When considering the organometallic compounds containing metals from Groups I, II and III, it is preferred for this invention to use organoaluminum compounds, organomagnesium compounds, organozinc compounds and organolithium compounds.

By the term "organoaluminum compound" is meant any organoaluminum compound responding to the formula

in which $R_1$ is selected from the group consisting of alkyl (including cycloalkyl), aryl, alkaryl, arylalkyl, hydrogen and fluorine, $R_2$ and $R_3$ being selected from the group of alkyl (including cycloalkyl), aryl, alkaryl, alkoxy and arylalkyl. Representative of the compounds responding to the formula set forth above are: diethylaluminum fluoride, di-n-propylaluminum fluoride, di-n-butylaluminum fluoride, diisobutylaluminum fluoride, dihexylaluminum fluoride, dioctylaluminum fluoride, and diphenylaluminum fluoride. Also included are diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenylethylaluminum hydride, phenyl-n-propylaluminum hydride, p-tolylethylaluminium hydride, p-tolyl-n-propylaluminum hydride, p-tolylisopropylaluminum hydride, benzylethylaluminum hydride, and other organoaluminum hydrides. Also included are diethylethoxyaluminum and dipropylethoxyaluminum. Also included are trimethylaluminum, triethylaluminum, tri-n-propylaluminum, triisopropylaluminum, tri-n-butylaluminum, triisobutylaluminum, tripentylaluminum, aluminum isoprenyl, trihexylaluminum, tricyclohexylaluminum, trioctylaluminum, triphenyl aluminum, tri-p-tolylaluminum, tribenzylaluminum, ethyldiphenylaluminum, ethyldi-p-tolylaluminum, ethyldibenzylaluminum, diethylphenylaluminum, diethyl-p-tolylaluminum, diethylbenzylaluminum and other triorganoaluminum compounds.

By the term "organomagnesium compounds" is meant first any organomagnesium complex responding to the formula $R_aMgX_b$ where R may be alkyl, aryl, arylalkyl or alkaryl; X is a halogen and "$a$" and "$b$" are mole fractions whose sum equals 2 while the ratio of $a/b$ is greater than 2 but is not infinite. Representative among the compounds responding to the formula set forth above are ethylmagnesium chloride complex, cyclohexylmagnesium bromide complex and phenylmagnesium chloride complex. Such compounds are usually prepared in the absence of ether.

Also, "organomagnesium compounds" means any organomagnesium compound or any organomagnesium halide of the Grignard type corresponding to the formulas $R_2Mg$ or $RMgY$ where R may be alkyl, aryl, arylalkyl or alkaryl and Y is fluorine, or $R'R''Mg$ where R' may be alkyl, aryl, arylalkyl or alkaryl and R'' may be either alkyl, aryl, arylalkyl or alkaryl. Representative among the compounds responding to these formulae are diethylmagnesium, dipropylmagnesium, ethylmagnesium fluoride and phenylmagnesium fluoride.

By the term "organozinc compound" is meant any organozinc compound responding to the formula $R_2Zn$ where R may be alkyl, aryl, alkaryl or arylalkyl. Representative among such compounds are diethylzinc, dibutylzinc or diphenylzinc.

By the term "organolithium compounds" is any organolithium compound responding to the formula R-Li where R is an alkyl, alkaryl, arylalkyl or aryl group. Representative among the compounds responding to the formula set forth above are ethyllithium, propyllithium, n-, sec- or t-butyllithium, hexyllithium, styryllithium or phenyllithium. Also, the organolithiumaluminum compounds may be used. These compounds respond to the formula $R'R''_3LiAl$ where R' and R'' may be alkyl, alkaryl or arylalkyl groups and R' and R'' may or may not be the same group. Representative of these compounds are n-butyltriisobutyllithium aluminum, tetrabutyllithium aluminum, butyltriethyllithium aluminum and tetraisobutyllithium aluminum.

Representative of other organometallic compounds with metals selected from Groups I, II and III of the Periodic System are compounds containing at least one of the metals, sodium, potassium, calcium, beryllium, cadmium and mercury combined with at least one organic radical selected from the group consisting of alkyls, alkaryls, arylalkyls and aryls.

The second component of the catalyst system of this invention is an organometallic compound which contains nickel and/or cobalt. The compound may be any organonickel compound or any organocobalt compound. It is preferred to employ soluble compounds of nickel and/or cobalt. These soluble compounds of nickel and/or cobalt are usually compounds of the said metals with a mono- or bi-dentate organic ligand containing up to 20 carbon atoms. "Ligand" is defined as an ion or molecule bound to and considered bonded to a metal atom or ion. Monodentate means having one position through which covalent or coordinate bonds with the metal may be formed; bi-dentate means having two positions through which covalent or coordinate bonds with the metal may be formed. By the term "soluble" is meant soluble in inert solvents. Thus, any nickel salt an/or cobalt salt of an organic acid, containing from about 1 to 20 carbon atoms may be employed, Representative of such organonickel compounds are nickel benzoate, nickel acetate, nickel naphthenate, bis(alpha furyl dioxime)nickel, nickel octanoate, nickel palmitate, nickel stearate, nickel acetylacetonate, bis(salicylaldehyde)ethylene diimine nickel and nickel salicylaldehyde. Nickel tetracarbonyl also may be employed as the nickel containing catalyst in this invention. The prefered component containing nickel is a nickel salt of a carboxylic acid or an organic complex compound of nickel.

Representative of such organocobalt compounds are cobalt benzoate, cobalt acetate, cobalt naphthenate, bis(alpha furyl dioxime)cobalt, cobalt octanoate, cobalt palmitate, cobalt stearate, cobalt acetylacetonate, bis(salicylaldehyde ethylene diimine)cobalt and cobalt salicylaldehyde. Dicobalt octacarbonyl also may be employed as the cobalt containing catalyst in this invention. The prefered component containing cobalt is a cobalt salt of a carboxylic acid or an organic complex compound of cobalt.

The third component of the catalyst system is a boron trifluoride complex prepared by complexing boron trifluoride with a member of the class of ketones, aldehydes, esters and nitriles, the complex being characterized by a carbon atom attached directly by a multiple bond to at least one atom selected from the group consisting of oxygen and nitrogen. The boron trifluoride molecule has a strong tendency to accept electrons from these donor molecules.

The ketone subclass can be defined by the formula R'COR where R' and R represent alkyl, cycloalkyl, aryl, alkaryl and arylalkyl radicals containing from 1 to about 30 carbon atoms; R' and R may be the same or dissimilar. These ketones represent a class of compounds which have a carbon atom attached by a double bond to oxygen. Representative but not exhaustive of the ketones useful in the preparation of the boron trifluoride complexes of this invention are acetone, methyl ethyl ketone, dibutyl ketnone, methyl isobutyl ketone, ethyl octyl ketone, 2,4-pentanedione, butyl cycloheptanone, acetophenone, amylphenyl ketone, butylphenyl ketone, benzophenone, phenyltolyl ketone, quinone and the like. The preferred complexes of the ketones are boron trifluoride·acetophenone and boron trifluoride·benzophenone.

The aldehyde subclass can be defined by the formula R—CHO where R represents an alkyl, cycloalkyl, aryl, alkaryl and arylalkyl radical containing from 1 to about 30 carbon atoms. The aldehydes have a carbon atom attached to an oxygen atom by means of a double bond. Representative but not exhaustive of the aldehydes are butyraldehyde, anisaldehyde, cinnamic aldehyde, isobutyraldehyde, heptaldehyde, dodecylaldehyde, benzaldehyde, phenylacetaldehyde, tolualdehyde, m-nitrobenzaldehyde, p-nitrobenzaldehyde, m-hydroxybenzaldehyde and the like. The preferred complexes formed from the aldehydes are boron trifluoride·benzaldehyde, boron trifluoride·tolualdehyde and boron trifluoride·m-nitrobenzaldehyde.

The ester subclass can be represented by the formula R'—COOR where R' and R are represented by alkyl, cycloalkyl, aryl, alkaryl, and arylalkyl radicals containing from 1 to about 30 carbon atoms. The esters contain a carbon atom attached by a double bond to an oxygen atom. Representative but not exhaustive of the esters are ethyl butyrate, ethyl octanoate, isopropyl hexanoate, amyl acetate, hexyl proprionate, cetyl acetate, ethyl benzoate, amyl benzoate, phenyl acetate, phenyl butyrate, phenyl benzoate and the like. The preferred complexes formed from the esters are boron trifluoride·ethyl benzoate and boron trifluoride·phenyl acetate.

The nitrile subclass can be represented by the formula RCN wherein R represents an alkyl, cycloalkyl, aryl, alkaryl and arylalkyl. The nitriles contain a carbon atom attached to a nitrogen atom by a triple bond. Representative but not exhaustive of the nitrile subclass are acetonitrile, butyronitrile, acrylonitrile, benzonitrile, tolunitrile, phenylacetonitrile, and the like. The preferred complex prepared from the nitriles is boron trifluoride·benzonitrile.

When not available commercially, many of the boron trifluoride complexes can be readily formed by directly contacting boron trifluoride gas, (a colorless gas at ordinary temperatures and pressures, its boiling point being —101° C.) with the compound used as the complexing agent, that is, the electron donor compound. This contact is accomplished with a reacting apparatus combined with a sensitive weighing mechanism in order to achieve the desired mole ratios between the $BF_3$ and the electron donor compound. The reaction is carried out under an inert atmosphere. The reaction environment may consist only of the reacting components, $BF_3$ gas and the electron donor compound, or when convenient, the reaction may be carried out in the medium of an inert organic diluent. This last condition is usually necessary when the electron donor compound exists as a solid and must be put into solution or suspension to insure adequate contact with the $BF_3$ gas.

The three component catalyst system of this invention has shown polymerization activity over a wide range of catalyst concentrations and catalyst ratios. Apparently, the three catalyst components interact to form the active catalyst. As a result, the optimum concentration for any one catalyst component is dependent upon the concentration of each of the other catalyst components. Although polymerization will occur over a wide range of catalyst concentrations and ratios, polymers having the most desirable properties are obtained over a narrower range. It has been found that polymerization will occur when the mole ratio of the organometallic compound in which the metal is selected from Groups I, II and III of the Periodic System (Me) to the organonickel compound (Ni) ranges from about 0.3/1 to about 500/1, and when the mole ratio of the boron trifluoride complex prepared by complexing boron trifluoride with a member of the class consisting of esters, aldehydes, ketones and nitriles ($BF_3$·complex) to the organonickel compound (Ni) ranges from about 0.33/1 to about 300/1, and where the mole ratio of the organometallic compound of Groups I, II and III metals (Me) to the $BF_3$·complex ranges from about 0.1/1 to about 4/1.

The preferred Me/Ni mole ratio ranges from about 1/1 to about 150/1; the preferred $BF_3$·complex/Ni mole ratio ranges from about 1/1 to about 150/1; and the preferred Me/$BF_3$·complex mole ratio ranges from about 0.3/1 to about 1.4/1.

When organocobalt compounds replace organonickel compounds or mixture of organonickel and organocobalt are used as the second catalyst component in the ternary system of this invention, the mole ratio of cobalt (Co) and/or nickel (Ni) to the other catalyst components are similar to those of nickel (Ni) shown above.

The three catalyst components may be charged to the polymerization system as separate catalyst components in either a stepwise or a simultaneous manner, sometimes called "in situ." The catalyst may also be "preformed" outside the polymerization system whereby all the catalyst components are mixed in the absence of the butadiene, either with or without an inert diluent and the complete blend then added to the polymerization system.

An improved preformed catalyst system can be prepared by having a small amount of a diolefin, for example, butadiene or isoprene present when the catalyst components, Me, Ni and $BF_3$ complex are mixed together. The diolefin apparently reacts with the catalyst components to form a catalyst complex which is more active, particularly when the polymerization system contains impurities, than either the in situ catalyst (which is prepared in the presence of a very large amount of monomer) or the simple preformed catalyst prepared in the absence of the diolefin. The improved preformed catalyst may be prepared by dissolving a small amount of diolefin in a hydrocarbon solvent such as benzene or hexane, and then adding the Me component, the Ni component and then the BF$_3$·complex component to the solvent.

The particular order of addition may be varied somewhat but it is advantageous to have (1) the diolefin present before the addition of both Me and Ni components and (2) the Ni component present before the addition of both Me and BF$_3$· complex catalyst components. The amount of the diolefin which can be present to form the improved preformed catalyst can be varied over a wide range, and of course, is somewhat dependent on the other catalyst concentrations. However, the amount of diolefin, preferably butadiene, used to prepare the preformed catalyst should be between about 0.001 and 3.% of the total amount of monomer to be polymerized. Based upon catalyst mole ratios, the diolefin to the Ni mole ratio should be between about 0.5/1 and 1000/1, and preferably between about 2/1 and 100/1.

The practice of this invention is further illustrated by reference to the following examples which are intended to be representative rather than restrictive of the scope of the invention. Unless otherwise noted, all parts and percentages are by weight.

EXAMPLE I

A purified butadiene in benzene solution containing 10 grams of butadiene per hundred milliliters of solution was charged to a number of 4-ounce bottles. Nitrogen was flushed over the surface of this premix while the catalyst was charged in the amounts shown in Table I$a$. The catalyst system employed was a mixture of triethylaluminum (TEAL), nickel octanoate (Ni salt or Ni Oct) and a boron trifluoride complex of a ketone as shown in Table I$a$ below. In one run, number 5, triisobutylaluminum (TIBAL) was used instead of triethylaluminum. The catalyst was charged by the "in situ" method. By "in situ" addition is meant that the catalyst components are added directly to the polymerization system and are not preblended, preformed or activated outside the polymerization system before addition. The bottles were tumbled end-over-end for the time intervals shown in Table I$b$ in a water bath maintained at 50° C. The polymerizations were deactivated by the addition to the system of an amine-type stopping agent and an antioxidant, both components being added as one part per hundred parts of original monomer charged. Catalyst components and catalyst concentrations are shown in Table I$a$ below. Results are given in Table I$b$.

TABLE I$a$

[Solvent, Benzene; Polymerization Temperature, 50° C.]

| | Millimoles/10 grams butadiene | | | |
|---|---|---|---|---|
| | R$_3$Al | Ni octanoate | BF$_3$·complex | BF$_3$·complex charged |
| Exp. No.: | | | | |
| 1 | 0.06 TEAL | 0.005 | 0.075 | Acetone. |
| 2 | 0.06 TEAL | 0.005 | 0.10 | Acetophenone. |
| 3 | 0.07 TEAL | 0.005 | 0.10 | Pentanedione. |
| 4 | 0.07 TEAL | 0.005 | 0.10 | Benzophenone. |
| 5 | 0.07 TIBAL | 0.005 | 0.10 | Do. |

TABLE I$b$

| | Yield, wt. percent at time in hours | | | | | |
|---|---|---|---|---|---|---|
| | 1 | 2 | 4 | 18 | DSV | Percent cis-1,4 |
| Example No.: | | | | | | |
| 1 | 8 | 35 | 55 | 87 | 2.0 | 98.0 |
| 2 | 24 | 55 | 87 | 100 | 2.3 | |
| 3 | | | | ²91 | 2.3 | |
| 4 | 76 | 91 | 93 | ²92 | 3.0 | 97.4 |
| 5 | 46 | 65 | 85 | ²100 | 2.1 | |
| 6 | | | | 68 | | |

¹ 16 hours.
² 23 hours.

EXAMPLE II

Butadiene was polymerized by a method similar to that used in Example I except that a series of BF$_3$ complexes of esters was used rather than BF$_3$ complexes of ketones. Catalyst components and catalyst concentrations are shown in Table II$a$. Results are given in Table II$b$.

TABLE II$a$

[Solvent, Benzene; Polymerization Temperature, 50° C.]

| | Millimoles/10 grams butadiene | | | |
|---|---|---|---|---|
| | R$_3$Al | Ni octanoate | BF$_3$·complex | BF$_3$=complex charged |
| Exp. No.: | | | | |
| 1 | 0.06 TEAL | 0.005 | 0.075 | Phenyl acetate. |
| 2 | 0.06 TEAL | .005 | 0.075 | Ethyl benzoate. |
| 3 | 0.07 TIBAL | 0.005 | 0.075 | Do. |

TABLE II$b$

| | Yield, wt. percent at time in hours | | | | | |
|---|---|---|---|---|---|---|
| | 1 | 2 | 4 | 18 | DSV | Percent cis-1,4 |
| Example No.: | | | | | | |
| 1 | 49 | 82 | 93 | | 2.2 | 97.2 |
| 2 | 45 | 80 | 95 | 92 | 3.3 | 98.0 |
| 3 | 34 | 44 | 63 | 96 | 1.7 | |

EXAMPLE III

Butadiene was polymerized by a method similar to that used in Example I except that a series of BF$_3$ complexes of nitrile compounds were used rather than BF$_3$ complexes of ketones. Catalyst components and concentrations as well as polymerization results are shown in Table III$a$ and III$b$.

TABLE III$a$

[Solvent, Benzene; Polymerization Temperature, 50° C.]

| | Millimoles/10 grams butadiene | | | |
|---|---|---|---|---|
| | TEAL | Ni octanoate | GB$_3$=complex | BF$_3$=complex charged |
| Example No.: | | | | |
| 1 | 0.06 | 0.005 | 0.15 | Acetonitrile. |
| 2 | 0.06 | 0.005 | 0.15 | Benzonitrile. |
| 3 | 0.07 | 0.022 | 0.08 | Acrylonitrile. |

TABLE III$b$

| | Yield, wt. percent at time in hours | | | | | | |
|---|---|---|---|---|---|---|---|
| | 1 | 2 | 4 | 18 | 41 | DSV | Percent cis-1,4 |
| Example No.: | | | | | | | |
| 1 | | | | 18 | | | |
| 2 | | 14 | 30 | 61 | 99 | | 9.80 |
| 3 | | | | | 57 | 1.6 | 91.8 |

EXAMPLE IV

Butadiene was polymerized by a method similar to that used in Example I except that several BF$_3$ complexes of various aldehydes were used rather than BF$_3$ complexes of ketones. Also different aluminum trialkyls were employed. Catalyst components and concentrations are shown in Table IV$a$ below. Polymerization results are given in Table IV$b$.

TABLE IV$a$

[Solvent, Benzene; Polymerization Temperature, 50° C.]

| | Millimoles/10 grams butadiene | | | |
|---|---|---|---|---|
| | R$_3$Al | Ni octanoate | BF$_3$=complex | BF$_3$=complex charged |
| Exp. No.: | | | | |
| 1 | 0.07 TEAL | 0.005 | 0.076 | Butraldehyde. |
| 2 | 0.07 TEAL | 0.005 | 0.070 | Heptaldehyde. |
| 3 | 0.07 TEAL | 0.005 | 0.11 | Salicaldehyde. |
| 4 | 0.07 TIBAL | 0.005 | 0.076 | Butyraldehyde. |
| 5 | 0.07 TIBAL | 0.005 | 0.070 | Heptaldehyde. |
| 6 | 0.07 TIBAL | 0.005 | 0.11 | Salicaldehyde. |

TABLE IVb

| | Yield, wt. percent at time in hours | | | | DSV | IR analysis percent cis |
|---|---|---|---|---|---|---|
| | 1 | 2 | 4 | 20 | | |
| Example No.: | | | | | | |
| 1 | 44 | | 75 | 85 | 3.66 | 97.4 |
| 2 | 8 | 32 | 62 | 94 | 3.64 | |
| 3 | 26 | 64 | 84 | 95 | 2.5 | 97.6 |
| 4 | 20 | | 68 | 90 | 2.3 | |
| 5 | 9 | 19 | 47 | 92 | 2.5 | |
| 6 | | 16 | 40 | 92 | 3.7 | |

The above data indicate that the series of aldehyde complexes shown in Table IV perform better with a triethylaluminum reducing catalyst component than a reducing component wherein the alkyl portion is of longer chain length than the ethyl radical.

EXAMPLE V

Butadiene was polymerized by a method similar to that used in Example IV except several $BF_3$ complexes of various specific aromatic aldehydes were used and in Experiment I trimethylaluminum (TMAL) was employed. Catalyst components and concentrations are shown in Table Va below; polymerization results are given in Table Vb.

TABLE Va

[Solvent, Benzene; Polymerization Temperature, 51° C.]

| | Millimoles/10 grams butadiene | | | |
|---|---|---|---|---|
| | $R_3Al$ | Ni octanoate | $BF_3$· complex | Aldehyde in $BF_3$-complex |
| Example No.: | | | | |
| 1 | 0.07 TEAL | 0.005 | 0.077 | p-Tolualdehyde. |
| 2 | 0.07 TEAL | 0.005 | 0.077 | m-NO$_2$-benzaldehyde. |
| 3 | 0.07 TEAL | 0.005 | 0.077 | p-NO$_2$-benzaldehyde. |
| 4 | 0.07 TIBAC | 0.005 | 0.075 | p-Tolualdehyde. |
| 5 | 0.07 TIBAL | 0.005 | 0.075 | m-NO$_2$-benzaldehyde. |
| 6 | 0.07 TIBAL | 0.005 | 0.075 | p-NO$_2$-benzaldehyde. |

TABLE Vb

| | Yield, wt. percent at time in hours | | | | DSV | IR analysis percent cis-1,4 |
|---|---|---|---|---|---|---|
| | 1 | 2 | 4 | 20 | | |
| Example No.: | | | | | | |
| 1 | 23 | 54 | 81 | 96 | 2.45 | |
| 2 | 40 | 68 | 81 | 90 | 2.29 | |
| 3 | 31 | 48 | | | | 97.7 |
| 4 | 45 | 76 | 93 | 97 | 2.29 | |
| 5 | 64 | 81 | 90 | | 2.52 | 97.4 |
| 6 | 46 | 72 | | | 2.69 | 97.6 |

The data from Table V indicate that many of the $BF_3$· complexes of various specific aromatic aldehydes perform better with TIBAL than with TEAL.

From the data set forth in the two previous examples, it is illustrated that ortho hydroxybenzaldehyde as represented by salicaldehyde appears to be an exception among the aromatic aldehydes in that it does not result in enhanced or even equal catalytic activity when it is utilized in conjunction with branched or tertiary carbon containing alkylaluminums.

EXAMPE VI

Butadiene was polymerized in a manner similar to that used in Example V except that several different organoaluminumcompounds were employed in conjunction with nickel octanoate and $BF_3$·benzaldehyde. The polymer yields obtained during the first two hours are indicative of the relative rate of polymerization with each of the organoaluminum compounds. The various organoaluminums are identified as follows:

| Name: | Code |
|---|---|
| Trimethylaluminum | TMAL |
| Triethylaluminum | TEAL |
| Tri-(n-hexyl)aluminum | TNHAL |
| Triisobutylaluminum | TIBAL |
| Tri(2-methyl-1-pentyl)aluminum | TIHAL |
| Diisobutylaluminum hydride | DIBAL–H |

TABLE VI

Solvent, Benzene; Polymerization Temperature, 50° C.
Catalyst, $R_1R_2Al$=0.07 millimole/10 g. butadiene
Ni Octanoate=0.005 millimole/10 g. butadiene

| | $R_1R_2Al$ | $BF_3$ benzaldehyde, millimole/ 19 gm. Bd | Yield, wt. percent in hours | | DSV |
|---|---|---|---|---|---|
| | | | 1 Hr. | 2 Hr. | |
| Example No.: | | | | | |
| 1 | TMAL | 0.077 | 38 | 69 | 2.73 |
| 2 | TEAL | 0.077 | 41 | 71 | 2.36 |
| 3 | TNHAL | 0.077 | 3 | | 2.66 |
| 4 | TIBAL | 0.065 | 62 | 88 | 2.44 |
| 5 | TIHAL | 0.06 | 46 | 78 | |
| 6 | DIBAL–H | 0.06 | 55 | 84 | 2.21 |

The last three organoaluminum compounds listed in Table VI contain branched chain hydrocarbons having tertiary carbon atoms. The data reveal that the polymerization rates when employing these organoaluminum compounds are significantly greater than when using tri-(n-alkyl)aluminums with $BF_3$·benzaldehyde.

While certain representative embodiments and details have been shown for the purpose of illustrating the invention, it will be apparent to those skilled in this art that various changes and modifications may be made therein without departing from the spirit or scope of the invention.

What is claimed is:

1. The process for the polymerization of butadiene and butadiene in mixture with other diolefins to form polymers containing a high proportion of the butadiene units in the cis 1,4 configuration comprising contacting at least one monomer from the group of butadiene and butadiene in mixture with other diolefins, under polymerization conditions, with a catalyst comprising (1) at least one organometallic compound in which the metal is selected from Groups I, II and III of the Periodic System, (2) at least one organometallic compound selected from the class consisting of nickel salts of carboxylic acids, organic complex compounds of nickel, nickel tetracarbonyl, cobalt salts of carboxylic acids, organic complex compounds of cobalt and dicobalt octacarbonyl and (3) at least one boron trifluoride complex prepared by complexing boron trifluoride with a member of the class consisting of ketones, aldehydes, esters and nitriles.

2. The process according to claim 1 in which butadiene-1,3 alone is employed.

3. A process according to claim 1 in which the organometallic compound of metals from Groups I, II and III of the Periodic System is selected from the group consisting of organoaluminum compounds, organomagnesium compounds, organozinc compounds and organolithium compounds; and in which the organonickel compound is selected from the group consisting of nickel salts of carboxylic acids and organic complex compounds of nickel; and in which the boron trifluoride complex is selected from the group consisting of $BF_3$·benzophenone, $BF_3$· phenyl acetate, $BF_3$·ethyl benzoate and $BF_3$·benzonitrile.

4. The process according to claim 1 in which the mole ratio of organometallic compound with metals selected from Groups I, II and III of the Periodic System/organonickel and/or organocobalt compound ranges from about 0.3/1 to about 500/1, the mole ratio of the $BF_3$·complex/ organonickel and/or organocobalt compound ranges from about 0.33/1 to about 300/1 and the mole ratio of the organometallic compound with metals selected from Groups I, II and III of the Periodic System/BF$_3$·complex ranges from about 0.1/1 to about 4/1.

5. The process according to claim 4 in which the preferred mole ratio of organo-metallic compounds with metals selected from Groups I, II and III of the Periodic System/organonickel and/or organocobalt compound ranges from about 1/1 to about 150/1; the preferred mole ratio of the BF$_3$·complex/organonickel and/or organocobalt compound ranges from about 1/1 to about 150/1; and the preferred mole ratio of the organometallic compound with metals selected from Groups I, II and III of the Periodic System/BF$_3$·complex ranges from about 0.3/1 to about 1.4/1.

6. The process according to claim 4 in which the catalyst is preformed in the presence of a small amount of the diolefin to be polymerized by adding to the diolefin (1) at least one organometallic compound in which the metal is selected from Groups I, II and III of the Periodic System and (2) at least one organometallic compound selected from the class consisting of organonickel and organocobalt compounds and subsequently adding (3) at least one boron trifluoride complex prepared by complexing boron trifluoride with a member of the class consisting of ketones, aldehydes, esters and nitriles, the mole ratio of the diolefin to the organonickel and/or organocobalt compound being between about 0.5/1 and 1000/1.

7. The process according to claim 3 in which the organometallic compounds with metals selected from Groups I, II and III of the Periodic System is an organoaluminum compound.

8. The process according to claim 7 in which the organoaluminum compound is selected from the group consisting of an aluminum trialkyl and a dialkylaluminum hydride.

9. The process according to claim 1 in which the organoaluminum contains a tertiary carbon in its alkyl groups.

10. The process according to claim 1 wherein the organometallic compound is an organoaluminum compound and the boron trifluoride is prepared by complexing boron trifluoride with an aromatic aldehyde selected from the class of benzaldehyde, p-tolualdehyde, m-nitrobenzaldehyde and p-nitrobenzaldehyde.

11. A catalyst composition comprising (1) at least one organometallic compound in which the metal is selected from Groups I, II and III of the Periodic System, (2) at least one organometallic compound selected from the class consisting of nickel salts of carboxylic acids, organic complex compounds of nickel, nickel tetracarbonyl, cobalt salts of carboxylic acids, organic complex compounds of vobalt and dicobalt octacarbonyl and (3) at least one boron trifluoride complex prepared by complexing boron trifluoride with a member of the class consisting of ketones, aldehydes, esters and nitriles.

12. The composition according to claim 11 in which the mole ratio of the organometallic compound with the metals selected from Groups I, II and III of the Periodic System/organonickel and/or organocobalt ranges from about 0.3/1 to about 500/1, the mole ratio of the BF$_3$·complex/organonickel and/or organocobalt compound ranges from about 0.33/1 to about 300/1 and the mole ratio of the organometallic compound with metals selected from Groups I, II and III of the Periodic System/BF$_3$·complex ranges from about 0.1/1 to about 4/1.

References Cited
UNITED STATES PATENTS

| | | | |
|---|---|---|---|
| 2,977,349 | 3/1961 | Brockway et al. | 260—94.3 |
| 3,170,905 | 2/1965 | Ueda et al. | 260—94.3 |
| 3,170,907 | 2/1965 | Ueda et al. | 260—94.3 |
| 3,219,650 | 11/1965 | Hill | 260—94.3 |

FOREIGN PATENTS 662,850  5/1963  Canada.

JOSEPH L. SCHOFER, Primary Examiner

R. A. GAITHER, Assistant Examiner

U.S. Cl. X.R.

252—429; 260—85.3

PO-1050
(5/69)

UNITED STATES PATENT OFFICE
CERTIFICATE OF CORRECTION

Patent No. 3,483,177      Dated December 9, 1969

Inventor(s) Morford C. Throckmorton and William M. Saltman

It is certified that error appears in the above-identified patent and that said Letters Patent are hereby corrected as shown below:

Column 1, line 69, "unltimate" should be -- ultimate -- .

Column 2, line 23, "that" should be -- the -- .

line 24, "the" should be -- that -- .

line 45, "on" should be -- one -- .

Column 3, line 10, "ortho-" should be underlined.

Column 5, line 39, "ketnone" should be -- ketone -- .

Column 8, lines 9, 39 and 69, "$BF_3$=complex" should be -- $BF_3$·complex -- .

line 39, "$GB_3$=complex" should be -- $BF_3$·complex -- .

line 53, "9.80" should be -- 98.0 -- .

Column 9, line 10, "3.7" should be -- 1.7 -- .

line 20, "$BF_3$ complexes" should be -- $BF_3$·complexes -- .

line 26, "51°C." should be -- 50°C. -- .

line 35, "TIBAC" should be -- TIBAL -- .

Column 10, line 5, "$BF_3$ benzaldehyde" should be -- $BF_3$·benzaldehyde -- .

line 11, under heading "1 Hr." the number "3" should be -- 34 -- .

Column 12, line 12, "vobalt" should be -- cobalt -- .

SIGNED AND SEALED
AUG 18 1970

(SEAL)
Attest:

Edward M. Fletcher, Jr.
Attesting Officer

WILLIAM E. SCHUYLER, JR.
Commissioner of Patents